(12) United States Patent
Wen et al.

(10) Patent No.: US 11,493,769 B2
(45) Date of Patent: Nov. 8, 2022

(54) HEAD-MOUNTED DISPLAY

(71) Applicant: STARVR CORPORATION, New Taipei (TW)

(72) Inventors: Chun-Hung Wen, New Taipei (TW); Chun-Hsien Chen, New Taipei (TW)

(73) Assignee: STARVR CORPORATION, New Taipei (TW)

(*) Notice: Subject to any disclaimer, the term of this patent is extended or adjusted under 35 U.S.C. 154(b) by 100 days.

(21) Appl. No.: 16/600,580

(22) Filed: Oct. 14, 2019

(65) Prior Publication Data

US 2020/0117012 A1   Apr. 16, 2020

(30) Foreign Application Priority Data

Oct. 15, 2018  (TW) .................................. 107136177

(51) Int. Cl.
*G02B 27/01*  (2006.01)

(52) U.S. Cl.
CPC ..... *G02B 27/0176* (2013.01); *G02B 27/0172* (2013.01); *G02B 2027/0178* (2013.01)

(58) Field of Classification Search
CPC ............ G02B 27/0176; G02B 27/0172; G02B 2027/0178; G02B 2027/0181; G02B 2027/0134; G02B 7/12; G02B 21/20; G02B 21/22; G02B 23/18; G02B 30/00; G02B 30/10; G02B 30/20; G02B 30/22; H04N 13/189; H04N 13/339
USPC ......................................................... 359/473
See application file for complete search history.

(56) References Cited

U.S. PATENT DOCUMENTS

2010/0188744 A1*  7/2010  Hengst .................... G02B 7/12
                                                          359/413
2017/0090145 A1*  3/2017  Lin ..................... G02B 27/0172

FOREIGN PATENT DOCUMENTS

| CN | 104698586 | 6/2015 |
|---|---|---|
| CN | 107588170 | 1/2018 |
| CN | 207586548 | 7/2018 |
| TW | I281552 | 5/2007 |
| TW | 201802537 | 1/2018 |
| TW | 201835637 | 10/2018 |

OTHER PUBLICATIONS

Office Action of Taiwan Counterpart Application, dated Jan. 18, 2019, pp. 1-5.

* cited by examiner

Primary Examiner — Thomas K Pham
Assistant Examiner — Henry A Duong
(74) Attorney, Agent, or Firm — JCIPRNET

(57) ABSTRACT

A head-mounted display including a body, a base and two lenses is provided. The base is disposed at the body, wherein the base has two assembly portions and each assembly portion has a base center. The two lenses are respectively rotatably disposed at the two assembly portions, wherein each lens has a lens center and the lens center of each lens is shifted with respect to the base center of the corresponding assembly portion. In a first state, a first distance is maintained between the two lens centers, and the two lens centers are located between the two base centers. In a second state, a second distance greater than the first distance is maintained between the two lens centers, and the two base centers are located between the two lens centers.

5 Claims, 4 Drawing Sheets

HEAD-MOUNTED DISPLAY

CROSS-REFERENCE TO RELATED APPLICATION

This application claims the priority benefit of Taiwan application serial no. 107136177, filed on Oct. 15, 2018. The entirety of the above-mentioned patent application is hereby incorporated by reference herein and made a part of this specification.

BACKGROUND

Technical Field

The disclosure relates to a display device, and particularly relates to a head-mounted display.

Description of Related Art

The so-called virtual reality refers to the use of computer simulation to generate a three-dimensional (3D) virtual environment to provide users with sensory simulations such as visual, olfactory or tactile sensation, so that the users may get a sense of immersive presence. Generally, the user uses a head-mounted display to obtain an image frame of the 3D virtual environment, where the head-mounted display may be roughly divided into two main parts of a display assembly and a headband, and the display assembly includes a display screen and lenses. Further, the lenses are used for adjusting an object distance and a focal length, and by using the display screen and the lenses in collaboration, the virtual environment becomes clear to the user.

In terms of an imaging principle of human eyes, when both eyes are gazing at a same object, the object is respectively imaged at retinas of the both eyes, and the images are superimposed on a visual center of the brain to form a complete and stereoscopic single object image, and such visual function is called binocular single vision. In the head-mounted display, the number of the lenses in the display assembly is at least two, and the lenses are arranged side by side. In order obtain an optimal visual effect, pupil centers, lens centers and a display screen center should be located on a same straight line. However, an interpupillary distance of each of the users is different, it is required to regulate a distance between the two lens centers to coincide with the interpupillary distance of the user. Existing regulation methods of the distance between the two lens centers may include physical regulation and software regulation, and in terms of the physical regulation, relative movement of the two lenses is generally implemented through cooperation of gears and racks, but the above regulation mechanism is of no avail for reducing a weight of the device and reducing a volume of the device. Besides, in response to the minimum distance between the two lens centers, the opposite sides of the two lenses need to be partially removed to avoid squeezing the user's nose.

SUMMARY

The disclosure is directed to a head-mounted display, which is able to be suitably adjusted to cooperate with an interpupillary distance of a user.

The disclosure provides a head-mounted display including a body, a base and two lenses. The base is disposed at the body, wherein the base has two assembly portions arranged side by side, and each of the assembly portions has a base center. The two lenses are respectively rotatably disposed at the two assembly portions, wherein each of the lenses has a lens center and the lens center of each of the lenses is shifted with respect to the base center of the corresponding assembly portion. In a first state, a first distance is maintained between the two lens centers, and the two lens centers are located between the two base centers. In a second state, a second distance greater than the first distance is maintained between the two lens centers, and the two base centers are located between the two lens centers.

Based on the above description, in the head-mounted display of the embodiment of the disclosure, each of the lenses is eccentrically disposed at the corresponding assembly portion, and each of the lenses is able to rotate with respect to the corresponding assembly portion. Therefore, by rotating the two lenses, the distance between the two lens centers may be adjusted to match an interpupillary distance of the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1A:
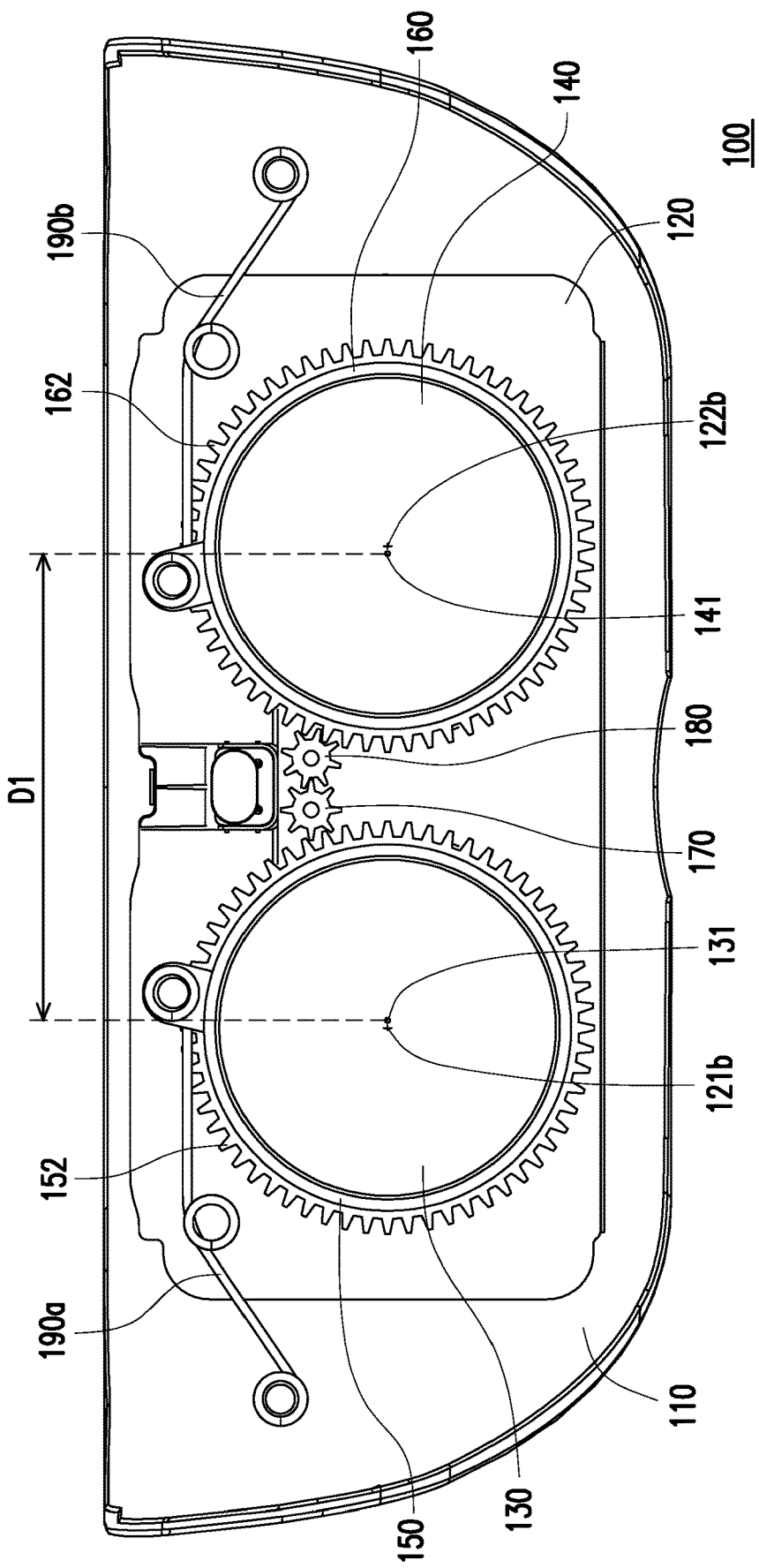
FIG. 1A is a schematic diagram of a head-mounted display in a first state according to an embodiment of the disclosure.
Figure 1B:
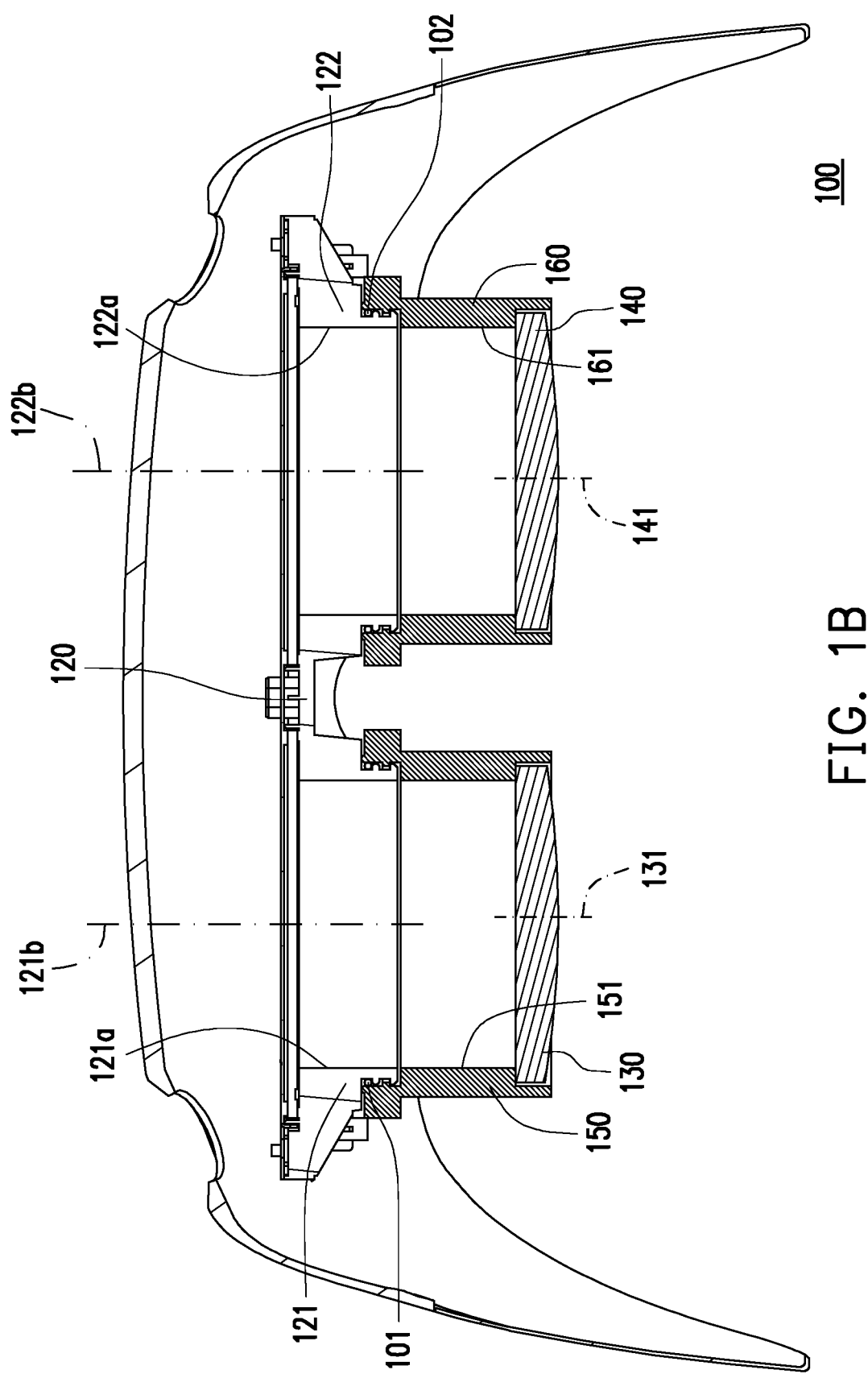
FIG. 1B is a partial cross-sectional schematic diagram of the head-mounted display of FIG. 1A.

FIG. 1A is a schematic diagram of a head-mounted display in a first state according to an embodiment of the disclosure. FIG. 1B is a partial cross-sectional schematic diagram of the head-mounted display of FIG. 1A. In order to clearly represent an internal structure configuration of the head-mounted display 100, a part of casing of a body 110 in FIG. 1A is illustrated in dash lines, and illustration of a part of components is omitted. Referring to FIG. 1A and FIG. 1B, in the embodiment, the head-mounted display 100 is applied to virtual reality, and may be worn on user's head. The head-mounted display 100 includes the body 110, a base 120, a first lens 130 and a second lens 140, where the body 110 may be configured with a processor, a display screen and other electronic components, which are configured to transmit or process signals, transmit or control a power supply and a display image, and the electronic components are not illustrated in the drawings.

The base 120 is disposed at the body 110, and may be fixed to the body 110 through screw lock, engagement or other combining method. The base 120 has a first assembly portion 121 and a second assembly portion 122 arranged side by side, where the first assembly portion 121 and the second assembly portion 122 are hollow structures, and respectively have a first through hole 121a and a second through hole 122a for light passing. On the other hand, the first lens 130 is rotatably disposed at the first assembly portion 121, and the second lens 140 is rotatably disposed at the second assembly portion 122. The first lens 130 is aligned with the first through hole 121a of the first assembly portion 121, and the second lens 140 is aligned with the second through hole 122a of the second assembly portion 122 for adjusting a propagation path of light.

In the embodiment, the first assembly portion 121 has a first base center 121b, which is, for example, a centroid of the first through hole 121a. The second assembly portion 122 has a second base center 122b, which is, for example, a centroid of the second through hole 122a. To be specific, a first lens center 131 of the first lens 130 is shifted with respect to the first base center 121b of the first assembly portion 121 by a first fixed distance, and a second lens center 141 of the second lens 140 is shifted with respect to the second base center 122b of the second assembly portion 122 by a second fixed distance. The first fixed distance is equal to the second fixed distance, and is not changed along with rotation of the first lens 130 relative to the first assembly portion 121 or rotation of the second lens 140 relative to the second assembly portion 122.

In the first state shown in FIG. 1A, the first base center 121b, the first lens center 131 of the first lens 130, the second lens center 141 of the second lens 140 and the second base center 122b are sequentially arranged, and fall on a same straight line. Namely, the first lens center 131 of the first lens 130 and the second lens center 141 of the second lens 140 are located between the first base center 121b and the second base center 122b, and the first lens center 131 of the first lens 130 and the second lens center 141 of the second lens 140 maintain a first distance D1 there between, so as to cope with one of interpupillary distances of a plurality of users.

Referring to FIG. 1A and FIG. 1B, in the embodiment, the head-mounted display 100 further includes a first sleeve 150 and a second sleeve 160, where the first sleeve 150 is rotatably disposed at the first assembly portion 121, and is configured to carry the first lens 130. On the other hand, the second sleeve 160 is rotatably disposed at the second assembly portion 122, and is configured to carry the second lens 140. Namely, the first lens 130 may be rotated around the first base center 121b of the first assembly portion 121 along with the first sleeve 150, and the second lens 140 may be rotated around the first second center 122b of the second assembly portion 122 along with the second sleeve 160.

In order to prevent external moisture or foreign matter from entering the internal of the body 110, a junction of the first sleeve 150 and the first assembly portion 121 is configured with a first seal member 101, and a junction of the second sleeve 160 and the second assembly portion 122 is configured with a second seal member 102. The first seal member 101 and the second seal member 102 may be seal rings respectively sleeved on an outer peripheral surface of the first assembly portion 121 and an outer peripheral surface of the second assembly portion 122. Further, the first sleeve 150 is sleeved on the outer peripheral surface of the first assembly portion 121, and the first seal member 101 is located between an inner peripheral surface of the first sleeve 150 and the outer peripheral surface of the first assembly portion 121. On the other hand, the second sleeve 160 is sleeved on the outer peripheral surface of the second assembly portion 122, and the second seal member 102 is located between an inner peripheral surface of the second sleeve 160 and the outer peripheral surface of the second assembly portion 122.

The first sleeve 150 and the second sleeve 160 are hollow structures, and respectively have a first extending through hole 151 and a second extending through hole 161 for light passing. Further, the first extending through hole 151 of the first sleeve 150 is aligned and communicated with the first through hole 121a of the first assembly portion 121. The first lens 130 is mounted in the first sleeve 150 at a side away from the first assembly portion 121. On the other hand, the second extending through hole 161 of the second sleeve 160 is aligned and communicated with the second through hole 122a of the second assembly portion 122. The second lens 140 is mounted in the second sleeve 160 at a side away from the second assembly portion 122.

Figure 2:
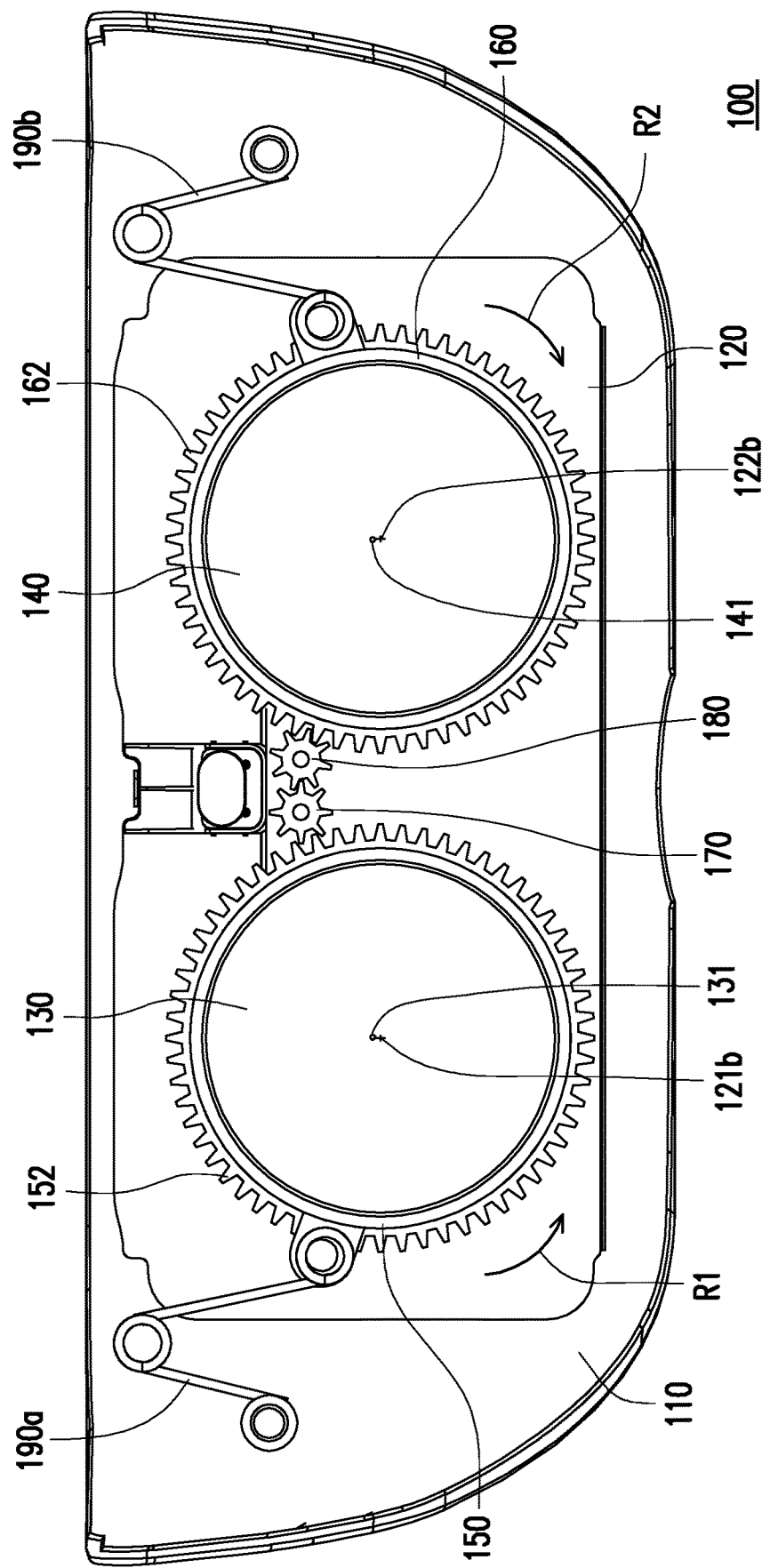
FIG. 2 is a schematic diagram of the head-mounted display of FIG. 1A transformed to a transition state.
Figure 3:
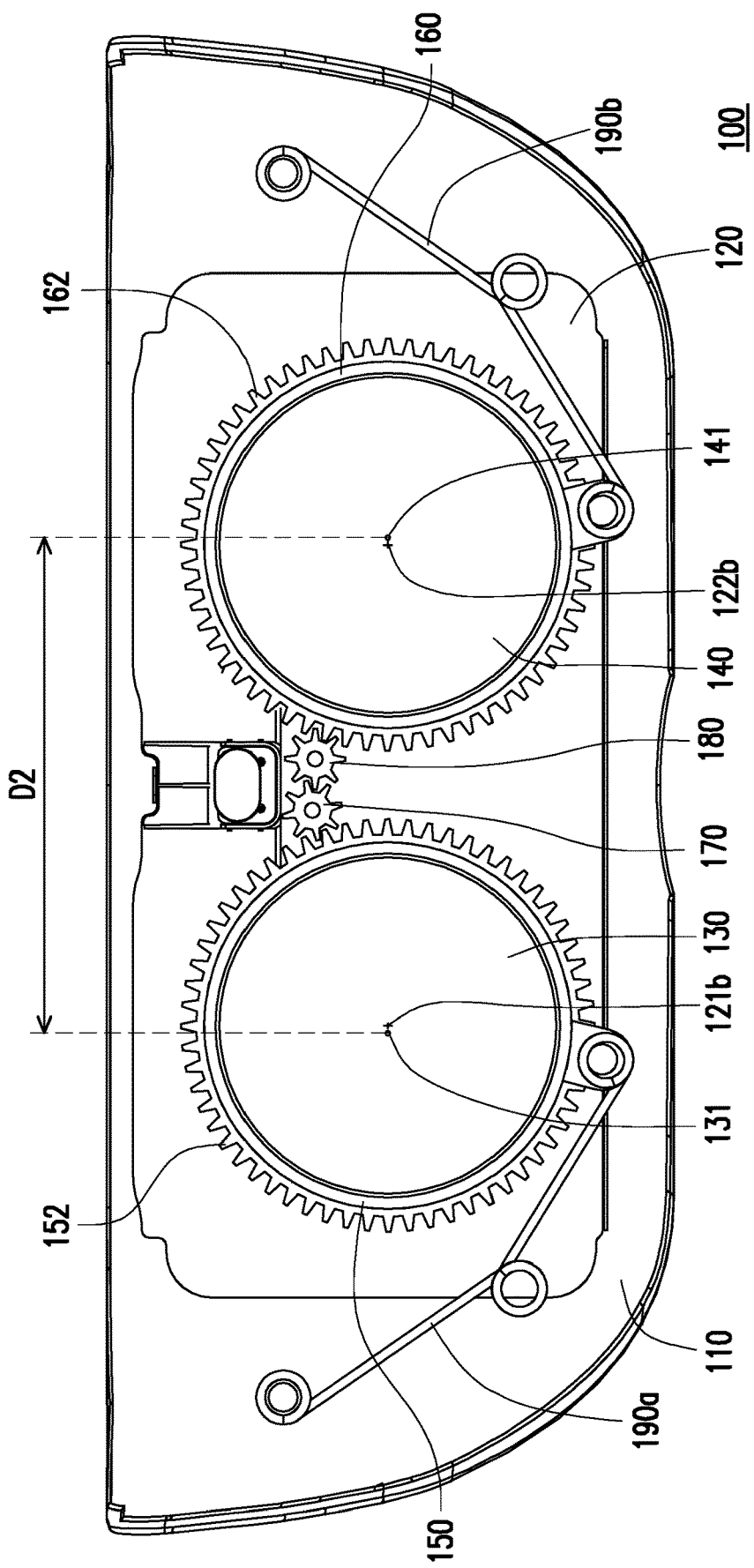
FIG. 3 is a schematic diagram of the head-mounted display of FIG. 1A transformed to a second state.

FIG. 2 is a schematic diagram of the head-mounted display of FIG. 1A transformed to a transition state. FIG. 3 is a schematic diagram of the head-mounted display of FIG. 1A transformed to a second state. In order to clearly represent the internal structure configuration of the head-mounted device 100, a part of casing of the body 110 in FIG. 2 and FIG. 3 is illustrated in dash lines, and illustration of a part of components is omitted. Referring to FIG. 1A, FIG. 2 and FIG. 3, by rotating the first sleeve 150 and the second sleeve 160, a distance between the first lens center 131 of the first lens 130 and the second lens center 141 of the second lens 140 is adjusted, i.e., the distance is switched between the first distance D1 shown in FIG. 1A and the second distance D2 shown in FIG. 3, so as to cope with at least two of the interpupillary distances of the plurality of users.

In the embodiment, the outer peripheral surface of the first sleeve 150 is configured with a first gear portion 152, and the outer peripheral surface of the second sleeve 160 is configured with a second gear portion 162. On the other hand, the head-mounted display 100 further includes a first auxiliary gear 170 and a second auxiliary gear 180 engaged with each other, pivoted to the base 120 and located between the first sleeve 150 and the second sleeve 160. Further, the first gear portion 152 is engaged with the first auxiliary gear 170, and the second gear portion 162 is engaged with the second auxiliary gear 180. When any one of the first sleeve 150 and the second sleeve 160 is rotated, through the collaboration of the first gear portion 152, the first auxiliary gear 170, the second auxiliary gear 180 and the second gear portion 162, another one of the first sleeve 150 and the second sleeve 160 is also synchronously rotated, and a rotation direction of the first sleeve 150 is opposite to a rotation direction of the second sleeve 160. The above design of the gear set avails reducing a weight of the head-mounted display 100 and reducing a volume of the head-mounted display 100.

During the adjustment produces shown in FIG. 1A to FIG. 3, the first lens 130 is rotated along with the first sleeve 150 along a first rotation direction R1, and the second lens 140 is rotated along with the second sleeve 160 along a second rotation direction R2 opposite to the first rotation direction R1, such that the first lens center 131 of the first lens 130 and the second lens center 141 of the second lens 140 are rotated out from between the first base center 121b and the second base center 122b. After the first sleeve 150 and the second sleeve 160 are rotated to a specific position, in the second state shown in FIG. 3, the first lens center 131 of the first lens 130, the first base center 121b, the second base center 122b and the second lens center 141 of the second lens 140 are sequentially arranged, and fall on a same straight line. Namely, the first base center 121b and the second base center 122b are located between the first lens center 131 of the first lens 130 and the second lens center 141 of the second lens 140, and the first lens center 131 of the first lens 130 and the second lens center 141 of the second lens 140 maintain a second distance D2 there between, so as to cope with another one of the interpupillary distances of the plurality of users. The second distance D2 is greater than the first distance D1, as the adjustment mechanism of the head-mounted display 100 is more flexible, the opposite sides of the first lens 130 and the second lens 140 are unnecessary to be partially removed.

In the embodiment, the head-mounted display 100 further includes a first elastic member 190a and a second elastic member 190b, where the first elastic member 190a and the second elastic member 190b may be implemented by torsion springs, and the first auxiliary gear 170 and the second auxiliary gear 180 are located between the first elastic member 190a and the second elastic member 190b. Further, two opposite end portions of the first elastic member 190a are respectively connected to the base 120 and the first sleeve 150, and two opposite end portions of the second elastic member 190b are respectively connected to the base 120 and the second sleeve 160.

In the first state shown in FIG. 1A, the first elastic member 190a and the second elastic member 190b are in an uncompressed state, and are able to prevent the first sleeve 150 and the second sleeve 160 from easily rotating relative to the base 120, so as to ensure that the first lens center 131 of the first lens 130 and the second lens center 141 of the second lens 140 maintain the first distance D1 there between. In the transition state shown in FIG. 2, the first elastic member 190a and the second elastic member 190b are in a compressed state, and if a rotation angle of the first sleeve 150 and the second sleeve 160 is greater than 90 degrees, elastic potential energy of the first elastic member 190a and the second elastic member 190b may be released, so as to respectively drive the first sleeve 150 to continually rotate along the first rotation direction R1 and drive the second sleeve 160 to continually rotate along the second rotation direction R2.

After the elastic potential energy of the first elastic member 190a and the second elastic member 190b is released, the first sleeve 150 and the second sleeve 160 are rotated to the specific position. In the second state of FIG. 3, the first elastic member 190a and the second elastic member 190b are in the uncompressed state, and are adapted to prevent the first sleeve 150 and the second sleeve 160 from easily rotating relative to the base 120, so as to ensure that the first lens center 131 of the first lens 130 and the second lens center 141 of the second lens 140 maintain the second distance D2 there between.

Based on the same operation principle, when any one of the first sleeve 150 and the second sleeve 160 is rotated oppositely, the first sleeve 150 and the second sleeve 160 may be restored from the second state shown in FIG. 3 to the first state shown in FIG. 1A, and the distance between the first lens center 131 of the first lens 130 and the second lens center 141 of the second lens 140 is restored from the second distance D2 to the first distance D1.

In summary, in the head-mounted display of the embodiment of the disclosure, each of the lenses is eccentrically disposed at the corresponding assembly portion, where each of the lenses is carried by the corresponding sleeve, and each of the lenses is able to rotate with respect to the corresponding assembly portion. Further, the two sleeves are coupled through the gear set, and by rotating one of the sleeves, the other one of the sleeve is driven by the gear set, and now the two lenses are respectively rotated along with the two sleeves along two different rotation directions, so as to adjust the distance between the two lenses to cope with the interpupillary distance of the user. On the other hand, the design of the gear set avails reducing the weight of the head-mounted display and reducing the volume of the head-mounted display.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A head-mounted display, comprising:
   a body;
   a base, disposed at the body, wherein the base has two assembly portions arranged side by side, and each of the assembly portions has a base center;
   two lenses, respectively rotatably disposed at the two assembly portions, wherein each of the lenses has a lens center and the lens center of each of the lenses is shifted with respect to the base center of the corresponding assembly portion;
   two sleeves, respectively rotatably disposed at the two assembly portions, and configured to carry the two lenses, wherein each of the two sleeves is configured to rotate around the base center of the corresponding assembly portion, and each of the two lenses is rotated along with the corresponding sleeve synchronously; and
   two auxiliary gears, engaged with each other, wherein the two auxiliary gears pivoted to the base and located between the two sleeves, wherein an outer peripheral surface of each of the sleeves is configured with a gear portion, one of the two gear portions is engaged with one of the two auxiliary gears, and another one of the two gear portions is engaged with another one of the two auxiliary gears, wherein the lens center of each of the lenses is kept from the base center of the corresponding assembly portion by a fixed distance, and the lens center of each of the lenses rotates around the base center of the corresponding assembly portion,
   in a first state, a first distance is maintained between the two lens centers, and the two lens centers are located between the two base centers,
   in a second state, a second distance greater than the first distance is maintained between the two lens centers, and the two base centers are located between the two lens centers.

2. The head-mounted display as claimed in claim 1, further comprising:
   two elastic members, each of the two elastic members having two opposite end portions, wherein the two end portions of each of the two elastic members are respectively connected to the base and the corresponding sleeve, and the two auxiliary gears are located between the two elastic members.

3. The head-mounted display as claimed in claim 2, wherein the two elastic members comprises torsion springs.

4. The head-mounted display as claimed in claim 1, wherein a junction of each of the sleeves and the corresponding assembly portion is configured with a seal member.

5. The head-mounted display as claimed in claim 1, wherein each of the assembly portions further has a through hole, and each of the sleeves has an extending through hole, the through hole of each of the assembly portions is aligned and communicated with the extending through hole of the corresponding sleeve.

\* \* \* \* \*